Patented Feb. 16, 1932

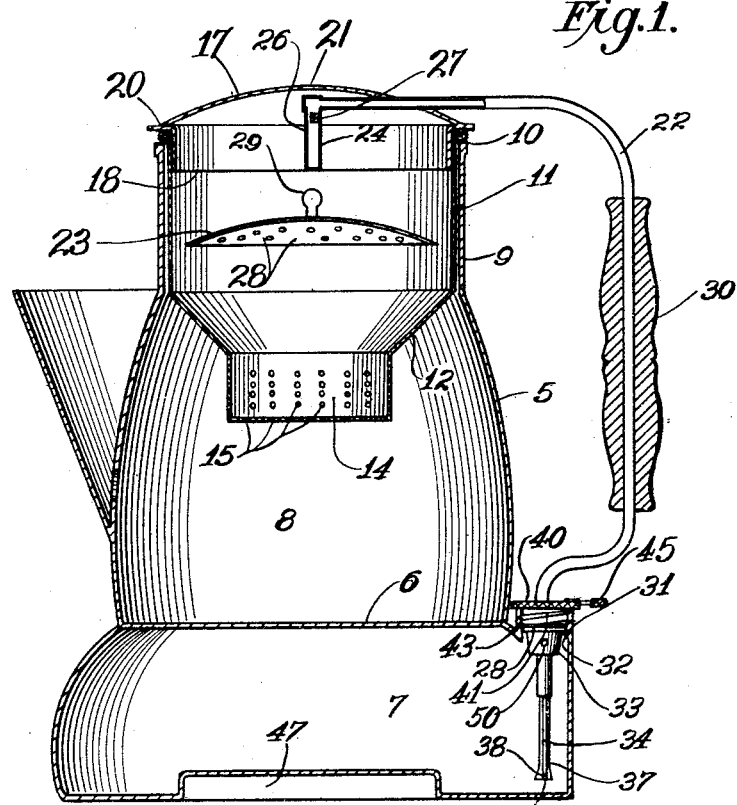

1,845,019

UNITED STATES PATENT OFFICE

STACEY A. HAINES, OF KANSAS CITY, MISSOURI, ASSIGNOR OF ONE-HALF TO HAROLD F. SPENCER, OF KANSAS CITY, MISSOURI

BEVERAGE BREWING DEVICE

Application filed August 19, 1929. Serial No. 386,957.

The present invention relates to beverage brewing devices, such as used for the preparation of coffee, tea or the like, and the primary object in view is to devise an improved form of the apparatus for the automatic infusion of such beverage material, or for the making of extracts, decoctions, or other infusions, regardless of the material used.

Accordingly, one of the features of improvement comprises a more efficient and adaptable construction for the filtering receptacle, for receiving the infusion material, whereby variable quantities of the material may be efficiently treated, in the same device.

A further feature of the improvements comprises a combination cover and conduit tube construction, having improved means for locking said structure in place with the conduit element in communication with the boiler chamber of the device.

A still further feature of the improvement comprises such a conduit construction having an audible alarm device combined with one end thereof and operative not only to spray the infusion liquid upon the contents of the infusion chamber, but also to emit an audible alarm as a signal of the termination of the infusion operation.

Another feature of the improvements resides in the construction of the boiler chamber with an improved form of filling opening adapted for the efficient filling of the boiler chamber from the hydrant in a convenient manner and without appreciably obstructing the escape of air from said chamber.

A further object of the invention is to provide a tube or conduit structure providing communication between the boiler and infusion chambers, and including an adjustable terminal within the boiler chamber for convenient regulation of the depth to which it is submerged in the liquid in the boiler, and hence of the period during which the infusion operation will take place.

It is also sought to provide an improved device of this character designed for appropriate and efficient operative engagement with a heater device, within the bottom of the apparatus, where the heater is constructed as a separate independent element of the apparatus.

With the foregoing general objects in view, as well as minor objects as will appear in the course of the detailed specification, the invention will now be described by reference to the accompanying drawings illustrating one form of embodiment of the proposed improvements, after which those features and combinations deemed to be novel will be set forth and claimed.

In the drawings—

Figure 1 is a central vertical sectional view, illustrating an apparatus constructed in accordance with the present invention; and Figures 2 and 3 are sectional details, hereinafter described.

Referring now to the drawings in detail, this illustrates my improved construction as comprising a container 5 of any appropriate material divided by an integral partition 6 into a boiler chamber 7 and an upper infusion chamber 8, the top of the body 5 being formed with a suitable neck portion 9, such as of cylindrical form as shown in Figure 1. The upper edge of the neck portion 9 is adapted for engagement by the roll or bead 10 formed upon the upper edge of the interior filtering receptacle 11, the upper portion of which receptacle is of a diameter adapted to fit within the neck portion 9 of the container, the lower portion of the receptacle 11 being of gradually downwardly tapered form as indicated at 12 in Figure 1, and terminating in a reduced portion 14, the bottom and sides of which are provided with suitable sets of perforations 15, for filtering purposes.

A cover member 17 is provided, having a depending skirt or flange 18 fitting within the mouth of the receptacle 11, and also having an outwardly projecting flange margin 20 resting upon the bead or roll 10 of the receptacle 11. The cover is also formed with a central vent opening 21 as shown in Figure 1.

For establishing communication between the infusion chamber and the boiler chamber 7, a conduit member is provided, in the form of a tube 22 having its upper end rigidly secured, as by soldering or the like, to the cover member 17, and terminating in a downwardly projecting whistle element 24 containing a ball 25 and having a lateral slot or orifice 26 plow the internal projection 27, as clearly illustrated in Figure 3. The orifice 26 thus provides a discharge opening for the spraying of the infusion liquid upon the contents of the receptacle 11, and also a sound emitting structure when the flow of liquid through the tube 22 stops, and steam is being conducted from the boiler and discharged through the opening 26. The exterior portion of the tube 22 is utilized to mount a handle member 30 through which the tube is extended and its lower portion projected through the filling opening 31 into the boiler chamber 7. The filler opening is provided with a tapered seat 32 adapted to be snugly engaged to form a liquid-tight seal by means of a tapered plug element 33 carried by the tube 22, the lower end of which is formed with a telescoping extension 34, as shown in Figures 1 and 2. The upper end portion of this extension 34 carries a plunger element 35 fitting inside the lower end of the tube 22, while the lower end of the extension is fitted with a disk element 36 provided with a pair of spring fingers 37 which are projected into the mouth of the tube 22 to provide frictional engagement therewith and thus maintain the extension tube 34 in any desired position, according to the level of the liquid in the boiler chamber 7 at which it is proposed to allow the steam to enter the tube 22, a lateral opening 38 being provided in the extension tube 34 above the disk element 36.

For rigidly locking the cover member 17 and the tube member 22 in position for use, a lock member 40 is provided, having the arrangement of half-threads or cam elements 41 illustrated in Figure 2, for quick and efficient locking engagement with similarly formed cam elements or threads 43 formed at the mouth of the opening 31, whereby only a partial turn of the lock member 40 will be required for either engaging or disengaging the cam elements for the purpose of locking and unlocking, respectively, the member 40 as required in the use of the apparatus. Any suitable finger engaging means, such as a handle element 45, or the like, may be provided for manipulating the locking member 40.

It will also be noted that the mouth of the filler opening 31 is arranged in horizontal position, and the area of said opening is of ample size to permit of filling the boiler chamber 7 from a hydrant, by setting the device directly under the hydrant or spigot, and allowing the stream of water to flow into the chamber 7 without any restriction of the water flow due to obstructing the escape of air from the chamber, as in cases of constructions where the opening is not so arranged or its size too restricted.

The bottom of the boiler chamber 7 is formed with an inset providing a comparatively shallow recess 47 as shown in Figure 1, for the purpose of accommodating a part of the heating element or structure where this is constituted as a separate part of the apparatus, thereby providing a compact and securely connected assembly adapted to promote the heat transfer action, when the device is put in operation.

A very important and novel purpose of the invention consists in causing the water to be delivered from the lower boiling chamber into the coffee receptacle for acting on the coffee to produce the desired infusion, only when the water is boiling hot, and never at lower temperatures through which it passes in reaching the boiling point; so that the elements extracted from the coffee in the infusion process are those which yield quickly only to boiling temperature, and do not include such as would yield to longer exposure to lower temperature. This purpose is effected by providing means for venting into the upper chamber of the device the initial pressure (lower than steam pressure) developed in the lower boiling chamber by the expansion of the air content of the boiling chamber so that water will not be forced up through the tube which leads the water from the boiling chamber to the receptacle until steam pressure is developed in the boiler chamber. For thus venting the earlier relatively lower pressure, a very restricted vent opening is made, as seen at 50, leading from the upper part of the boiling chamber into the water-conducting tube, through which opening the lower pressure passes without carrying any water to the upper chamber, from which also it is dissipated without causing any discharge of water from the device.

It will thus be seen that I have provided a neat, compact and simple as well as efficient construction for fulfilling all the desired objects of the invention. In operation, the cover and tube connected thereto are unlocked and temporarily disconnected from the container 5, for the purpose of supplying the ground coffee or other material to be treated, into the filtering receptacle 11, over which material the distributor plate 23 is placed and, after a suitable quantity of water is allowed to flow into the boiler chamber 7, the cover member is replaced, with the lower end of the tube inserted in the boiler chamber, and locked in place by the lock member 40, by a quick part-turn of said locking member. According to the length of time required for the infusion operation, the tube extension 34 will be set, that is, lower or higher, according to the level of the liquid in the chamber 7 at which it will no longer enter the opening 38 of the tube, but will be replaced by a flow of steam through the tube and into the infusion chamber 8. When the liquid flow stops, and steam is allowed to enter the tube 22, the pressure of the steam flow will cause the whistle 24 to emit an audible signal, acting as an alarm or warning that the infusion state of the brewing operation has been completed.

The character of the filtering receptacle involves a design which adapts its use for either a small or larger quantity of the coffee or other material being treated, since, with a comparatively small quantity, this will be accommodated in the lower reduced portion 14 of said receptacle; and on the other hand, for various larger quantities, these will be accommodated by the gradually increasing size of the intermediate portion 12 of the filtering receptacle.

The advantage of this construction lies in the fact that the different quantities of the material are subjected to the respectively appropriate degrees of filtering action, since the size and shape of the reduced portion 14 is that best adapted for such small quantity of the material, and the flaring portion 12 allows increased quantities to be treated by a flow of the infusion liquid not only from above and downward through this material, but also from points laterally as the liquid is directed substantially horizontally inward through the mass of material from the sides of the flaring portion 12, as will be readily understood. Thus a compact small mass of the material is effectively subjected to the infusion action, but increased quantities, to any desired extent, may be as effectively treated by means of a filtering receptacle having this peculiar design.

The convenience with which the apparatus may be handled and operated is increased by the self contained cover and conduit and handle structure, allowing the cover to be manipulated simultaneously with the placing and replacing of the conduit member, and the locking of the latter by means of the element 40 operating simultaneously to lock the cover device in place, all without any further act or attention.

It will be apparent that the design and shape of the whistle portion 24 of the tube may be varied so as to provide different character of signal noises or sounds, whereby the operator may know at once, simply by the character of the sound emitted at different times, the stage of the infusing operation, or the extent to which this has progressed.

While I have illustrated and described what I now regard as the preferred mode of practicing my invention, I desire to reserve the right to make all such changes or modifications as may fairly fall within the scope of the appended claims.

Having thus described my invention, what I claim and desire to secure by Letters Patent is:

1. A beverage brewing device comprising a receptacle divided into an upper infusion receiving compartment and a lower boiler compartment having a filling opening, a cover for the upper compartment, a tube rigidly secured to said cover and provided with a combined discharge orifice and audible alarm element within said cover, the remaining portion of said tube being formed as an exterior handle member provided with an extension communicating with the boiler compartment, and means for detachably securing said tube extension within said filling opening.

2. A beverage brewing device comprising a receptacle divided into an upper infusion receiving compartment and a lower boiler compartment having a filling opening, formed with an inwardly tapered seat around the mouth thereof, a cover for the upper compartment, a tube extending through said cover and providing an exterior handle for the receptacle and also means of communication between the boiler and upper compartments, a tapered closure plug surrounding said tube in engagement with said tapered seat, and a locking collar carried by the tube above said plug, said collar and filling opening having cooperating cam elements operable by a partial turn of the collar for locking said collar and securing the tube and cover member in operative relation to the receptacle.

3. A beverage brewing device comprising a receptacle divided into an upper infusion receiving compartment and a lower boiler compartment having a filling opening, a cover for the upper compartment, a tube providing an exterior handle for the receptacle and also a communicating passage from the boiler to the upper compartment, and a tubular extension in telescoping frictional engagement with the lower end of said tube and provided with a terminal disk element and with a lateral intake opening above said disk.

In witness whereof I hereunto affix my signature.

STACEY A. HAINES.